Patented Oct. 28, 1952

2,615,881

UNITED STATES PATENT OFFICE 2,615,881

POLYMETHYLPENTADIENE SYNTHETIC RUBBER

William J. Sparks and Robert M. Thomas, Westfield, N. J., and Donald C. Field, Baton Rouge, La., assignors to Standard Oil Development Company, a corporation of Delaware No Drawing. Application October 4, 1951, Serial No. 249,816

10 Claims. (Cl. 260—82.1)

1

This invention relates to low temperature polymeric materials, and relates particularly to low temperature polymers of the higher polyolefins especially the hexadienes.

It has been found possible to produce rubber-like bodies by a variety of polymerization processes including the low-temperature polymerization of the isoolefins, particularly isobutylene, in the presence of minor amounts of various of the diolefins by the application thereto of a dissolved Friedel-Crafts catalyst, the preferred temperatures ranging from −20° C. to −100° C. or lower to −165° C. as shown in Patent 2,356,128; and it has been found possible to produce rubber-like bodies from the diolefins by a polymerization in emulsion at or slightly above room temperature by the use of oxygen catalysts, or in mass reactions by the use of a variety of catalysts in the liquid olefinic material. However, attempts to polymerize butadiene alone at low temperatures by the application of a Friedel-Crafts catalyst have resulted only in powdery, brittle, insoluble polymers of little or no commercial utility; and the higher diolefins have been resistant to polymerization processes generally.

The present invention is based upon the discovery that polyolefins having 5 carbon atoms in a linear chain with one of the double linkages between the first and second carbon atoms from either the same end or the other end, are responsive to a low temperature polymerization reaction utilizing a Friedel-Chafts type catalyst, preferably in solution in a low-freezing, non-complex-forming solvent, to yield highly valuable polymers of high strength, and having a high elongation comparable to that of rubber. The methyl pentadienes utilized for this invention have the general formula:

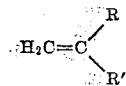

in which R is hydrogen or methyl, and R' is an olefinic group having 3 to 4 carbon atoms and an olefinic double bond, the total number of carbon atoms in R and R' being 4. Typical materials of the present invention are found in such substances as 2-methyl-pentadiene-1,3 or its isomer 2-methyl-pentadiene-2,4.

Commercially available materials consisting essentially of one or more of such hexadienes may be used, with or without the presence of inert diluent materials. One particularly suitable commercial product is one which consists essentially of a mixture of about 70 to 85% of

2

2-methyl pentadiene-1,3 and 30 to 15% of its isomer 2-methyl pentadiene-2,4 (which may also be called 4-methyl pentadiene-1,3). This commercial mixture is obtained by dehydration of 2-methyl 2,4 pentanediol, which in turn is obtained commercially by hydrogenation of the product formed by condensing two moles of acetone together. The dehydration of the pentanediol is discussed in J. A. C. S. volume 64, page 787–90. Both of these isomers polymerize by use of the low temperature Friedel-Crafts technique, because it is not difficult to get almost complete conversion of the monomers into a high molecular weight rubbery solid polymer.

The fact that these isohexadienes can be polymerized to solid products at all is very surprising, and that they polymerize to rubbery products is even more surprising, because similar homopolymerization of the lower diolefins such as butadiene and isoprene by low temperature Friedel-Crafts technique generally results in hard resinous highly interlinked polymerization products. On the other hand, even this same 2-methyl pentadiene-1,3 does not polymerize substantially at all when subjected to normal emulsion polymerization with a peroxide type catalyst as has been found very satisfactory for polymerizing butadiene with a minor amount of styrene to make fairly satisfactory commercial synthetic rubber. To show how poor is the polymerization of the 2-methyl pentadiene by emulsion polymerization, the following experiments are shown which were carried out using the procedure generally recommended by the Government for the manufacture of a synthetic rubber of the GR-S type (75% butadiene and 25% styrene).

Three experiments were made in each of which 200 grams of freshly distilled methyl pentadiene (commercial product consisting essentially of 2-methyl pentadiene-1,3 but containing a minor proportion of the isomer 4-methyl pentadiene-1,3) was emulsified with 10 grams of slightly hydrogenated distilled fatty acids (SHDA), 25 cc. of 1.039 NaOH, and 325 cc. of $H_2O$, and then polymerized using as catalyst 0.6 gram of $K_2S_2O_8$ in 50 cc. of $H_2O$, at a temperature of 50° C. for 19 hours. In all three of these check runs, no polymer was obtained; in other words the percent conversion to polymer was 0. Three other runs, substantially similar, but using chiefly a different emulsifier formula, were made, but with almost equally poor results. In these latter 3 experiments 200 grams of the same methyl pentadiene were subjected to the same polymerization temperature of 50° C. for 19 hours, using as catalyst 0.6 gram of $K_2S_2O_8$ in 80 cc. of water, and emulsified with 3 different emulsifiers. The fourth experiment used 10 grams of SHDA (freshly obtained from cold storage, whereas in the first three runs the material has been out of cold storage for a period), and 25 cc. of 1.039 N NaOH and 300 cc. of $H_2O$. The emulsifier in the fifth experiment was 10 grams of oleic acid, 32.8 cc. of 1.039 N NaOH, and 300 cc. of $H_2O$. The emulsifier used in the sixth experiment was 27 grams of Orvus paste (sulfate of Lorol alcohols averaging about 12 to 13 carbon atoms, and obtained by hydrogenation of coconut oil), 0.6 gram of $NaHCO_3$, and 300 cc. of $H_2O$. The results of these latter three experiments were that in experiment 4 no polymer was obtained, in experiment 5 the conversion was only 8.5%, and in experiment 6 the conversion was 7%, in both of these two latter cases the product being a putty-like material and not a rubber. The low conversions of 7 and 8.5% indicate that the amount of polymer formed is insignificant and totally impractical, under polymerization conditions which normally give good results with the standard GR-S type of synthetic rubber.

In contrast, the present invention polymerizes hexadienes having an iso structure and 5 carbon atoms in the linear chain by the application thereto of a Friedel-Crafts catalyst such as aluminum chloride, in solution in a low-freezing, non-complex forming solvent such as ethyl or methyl chloride or carbon disulfide, or the like below —20° C. to yield polymers which are reactive with sulfur in a typical vulcanization reaction to produce cured polymers of high tensile strength, good elongation and good flexure and abrasion resistance but varying if desired to lower molecular weight, high modulus or even brittle substances which are useful as such or in admixture with a wide range of other rubber-like or polymeric bodies to modify the modulus thereof, the processing characteristics and the wear properties, and to improve in many other respects the physical properties of the polymeric materials, and to make them applicable to the solving of specific structure problems. Other objects and details of the invention will be apparent from the following description:

In practising the present invention, the material is cooled to a temperature below about —20° C., preferably to a temperature between —40° C. and —100° C. or even as low as —164° C., either by the use of a refrigerating jacket upon a container for the diolefin, or alternatively, by the direct admixture with the diolefin of such refrigerants as solid carbon dioxide, or liquid ethylene, or liquid ethane, or liquid methane, or the like. To the cold olefinic material there is then added a dissolved Friedel-Crafts catalyst such as aluminum chloride dissolved in ethyl chloride. The polymerization proceeds at good speed to yield the desired polymer. When a sufficient amount of the diolefin has polymerized into the desired product, the reaction mixture may be dumped into warm water or warm soda solution or other alkaline material to inactivate the catalyst and volatilize any residual olefinic material and refrigerant and to bring the polymer up to room temperature. The polymer may then be washed with further quantities of water as on the open mill, and then dried for further processing.

For the catalyst, any of the Friedel-Crafts catalyst disclosed by N. O. Calloway in his article on "Friedel-Crafts synthesis" printed in the issue of "Chemical Review" published for the American Chemical Society at Baltimore in 1935, in volume XVII, No. 3, the article beginning on page 327, the list being particularly well shown on page 375, may be used, according to the type of material to be polymerized, the temperature at which the polymerization is conducted and the molecular weight desired in the finished polymer. For the catalyst solvent, substantially any of the low boiling saturated hydrocarbon halides may be used, whether they are mono or poly halides, provided their freezing point is below about 0° C. the essential requirement being a reasonably low-freezing point and the lack of complex-formation by the solvent with the Friedel-Crafts compound (as shown by volatilization of the solvent away from the solute, to leave only the solute as residue).

It may be noted also that the gaseous Friedel-Crafts type catalysts such as boron trifluoride are also usable either in solution, or merely bubbled through the cold reaction mixture. This latter point is very unique, namely that gaseous boron fluoride will successfully polymerize the methyl pentadiene into a satisfactory high molecular weight synthetic rubber. This is very surprising because, heretofore, isobutylene has been the only material known to homopolymerize to a high molecular weight elastomeric material by the use of gaseous boron fluoride as catalyst. Furthermore, stannic chloride and antimony chloride and other Friedel-Crafts catalysts which are normally not considered nearly as good as aluminum chloride, and work rather slowly or poorly with isobutylene, work rapidly and efficiently for polymerizing the 2-methyl pentadiene. This unusual behavior toward Friedel-Crafts catalysts emphasizes the unique character of the 2-methyl pentadiene structure for making synthetic rubbery homopolymers from this material as the only reactant, i. e. without any monoolefin present.

The resulting polymer has unique resistance to oxidation and also has unusual bonding characteristics, particularly for bonding to other types of synthetic rubber such as the low unsaturation vulcanizable isoolefin-diolefin synthetic rubber, and bonding to metal, etc.

The resulting polymer may have a molecular weight within the range of 5,000 to 50,000 or higher, as determined by the Staudinger method.

The polymer may be compounded in a manner closely analogous to that used for compounding rubber, such substances as carbon black, stearic acid, zinc oxide, sulfur, and the usual vulcanization accelerators being suitable compounding agents. The compounding may be conducted on the open roll mill and the curing may be conducted under conditions of heat and pressure in a manner closely analogous to that utilized for rubber to yield a material of good tensile strength. Alternatively, the material by suitable modifications in the polymerization process and suitable modification of the compounding recipe may be utilized for the formation of films, either rubber-like or leathery, or for the making of leathery to hard molded objects. Alternatively, since the material is thermoplastic it may be used for the making of molded articles without a curing reaction.

Example 1

A mixture was prepared consisting of 200 parts by weight of commercial hexadiene consisting mostly of 2-methyl pentadiene-1,3 with a minor amount of 4-methyl-pentadiene-1,3 but substantially no mono-olefins or other reactants, with 400 parts by weight of solid carbon dioxide and 200 parts by weight of methyl chloride. When the mixture was cooled to approximately −78° C., it was stirred and to the cold olefinic material there was then added 50 parts by weight of a solution of methyl chloride containing 1% of aluminum chloride in solution. The polymerization reaction proceeded promptly to yield a polymer which was a yellow solid. The cold material was dumped into warm water containing small quantities of alcohol to volatilize the residual $CO_2$ and the methyl chloride. At room temperature the polymer was a tacky colorless substance having a molecular weight of approximately 20,000.

This material was compounded according to the following recipe:

| | Parts |
|---|---|
| Polymer | 100 |
| Carbon black | 50 |
| Stearic acid | 5 |
| Zinc oxide | 3 |
| Sulfur | 3 |
| Tetra methyl thiuram disulfide | 1 |

The compounding was conducted on the open roll mill, and when the compound had attained a homogeneous condition, it was placed in moulds and cured at a temperature of 137° C. for 60 minutes. Test samples cut from the cured product showed tensile strengths ranging above 1000 pounds per square inch and elongations at break of 200 to 500%.

Thus the polymer cures into a useful rubber-like material.

Another experiment utilizing the proportions and procedure of Example 1 was conducted upon a much purer sample of hexadiene. This reaction was found to be distinctly more satisfactory, and the resulting polymer, when compounded according to the same recipe and cured, showed a tensile strength well above 2000 pounds to the square inch.

*Example 2*

A mixture was prepared consisting of 200 parts by weight of hexadiene and 400 parts by weight of liquid ethylene. A slow stream of boron trifluoride was passed through the cold olefinic material for a brief interval of time, approximately one minute. A solid polymer separated out promptly in dry form. When approximately 95% of the hexadiene had polymerized, the mixture was dumped into warm soda solution to volatilize the excess ethylene, and was then worked on the mill to drive out any unpolymerized hexadiene and to dry the polymer preparatory for compounding.

The resulting solid polymer was compounded according to the same recipe as in Example 1, cured in the same manner, and test samples cut from the cured material. Upon test, these samples were found to have a tensile strength of approximately 1000 pounds per square inch and an elongation at break of approximately 400%. These results again showed the production of a valuable olefinic polymer material by the process of the present invention.

These materials are useful as rubber-like bodies of high modulus, either in "pure gum form" when cured with sulfur, or in the usual rubber compounding formulae. They are reactive directly with sulfur, because of the high unsaturation, and the reaction is markedly facilitated and speeded by the use of various of the ordinary vulcanization accelerators used with natural rubber. The materials are particularly valuable for compounding with other rubber-like materials either as extenders or as modifiers. They are particularly useful as plasticizers for polybutadiene, especially the copolymer of butadiene with styrene or with acrylonitrile. They are useful as compounding agents with the copolymer of isobutylene with a diolefin such as butadiene, isoprene, piperylene, dimethyl butadiene, and the like, produced at low temperature; since small amounts very substantially increase the modulus of the cured copolymer.

They are readily compounded with polyethylene and serve to improve the elasticity and elongation and may be used to reduce the tendency towards brittleness of polyethylene. They are advantageous in this composition either cured or uncured and they cure readily in the presence of substantial proportions of polyethylene. Amounts of the present low temperature polymers as small as 3 to 5% in polyethylene substantially improve its properties, and compounds containing a major proportion of the present polymers with amounts of polyethylene as small as 5% to 3% show interesting properties departing substantially from those of the present polymer alone. Similarly the materials compound readily with simple polyisobutylene to yield a substantial improvement in the physical properties of the simple polymer.

It will be noted that the raw material for this polymerization reaction must have 5 carbon atoms in the linear chain of the molecule and a methyl substituent on a carbon atom having an olefinic linkage.

Because of the high unsaturation of this material, as indicated by an iodine number ranging from 300 to 350, the properties are quite like those of natural rubber and the material is not only reactive with sulfur in a typical vulcanization reaction, but it is also reactive with elemental chlorine; with hydrogen chloride and with sulfur chloride.

*Example 3*

A sample of the polyhexadiene of Example 2 was dissolved in carbon tetrachloride and chlorine bubbled through the solution until no more was absorbed. A substantial heat of reaction was developed, raising the temperature of the solution by a substantial amount. The chlorinated polymer was then precipitated by the addition of alcohol and the precipitated chlorinated polymer was separated from the carbon tetrachloride-alcohol mixture. The precipitated chlorinated polymer was dried on a warm roll mill to yield a hard, resinous thermoplastic material of high chlorine content. This material was found to be highly soluble in aromatic solvents and closely resembled rubber chloride in its chemical and physical properties. It was found to be an excellent coating material for paints and enamels, and, in general, was found to be a fully satisfactory substitute for rubber chloride in all of the many uses for which rubber chloride is suitable.

*Example 4*

A portion of polyhexadiene from Example 2 was dissolved in toluene and cooled to −78° C. by the application of a refrigerant jacket of solid carbon dioxide in isopropyl alcohol. Anhydrous hydrogen chloride was bubbled through the solution until it was saturated. The solution was then removed from the cooling bath and warmed up to room temperature. The polymer hydrochloride was then precipitated by the addition of alcohol to the toluene solution and the solid precipitate was separated from the toluene-alcohol mixture. The solid polymer hydrochloride was then dried by working on a warm mill. The material was a thermoplastic resin, highly soluble in organic solvents and reactive with sulfur in a typical vulcanization reaction. It contained sufficient chlorine to be non-inflammable.

*Example 5*

A further portion of polyhexadiene from Example 2 was dissolved in toluene and coated upon a form in the manner in which dipped rubber goods are prepared. The coated form was then dipped in a sulfur monochloride solution. Upon removal from the sulfur chloride solution and volatilization of excess sulfur chloride and solvent, the film was found to be satisfactorily vulcanized to yield an excellent article of dipped goods.

Thus the invention provides a new rubber-like polymer of $C_6$ diolefins prepared by a low temperature polymerization reaction with a catalyst in the form of a Friedel-Crafts type catalyst either as such or in solution in a low-freezing non-complex forming solvent.

This application is a continuation-in-part of our previously filed application Serial No. 490,054, filed June 8, 1943, now abandoned.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

What is claimed is:

1. The process which consists in subjecting a methyl pentadiene having the methyl substituent on a carbon atom having an olefinic linkage to polymerization at a temperature of about $-20°$ C. to $-164°$ C. in the presence of a Friedel-Crafts catalyst.

2. The process of making a synthetic rubber of high unsaturation, which consists essentially in homopolymerizing 2-methyl pentadiene, at $-40°$ C. to $-164°$ C. in the presence of a Friedel-Crafts catalyst.

3. The process of making a synthetic rubber of high unsaturation corresponding to an iodine number in the range of 300 to 350, which comprises homopolymerizing the isomeric 2-methyl pentadiene product obtained by dehydrogenation of 2-methyl 2,4 pentanediol, by carrying out the polymerization in the presence of ½ to 10 volumes of inert diluent per volume of reactants, at a temperature of about $-40°$ C. to $-164°$ C., in the presence of a Friedel-Crafts catalyst.

4. The process of making a diolefin homopolymer synthetic rubber of high unsaturation in the range of 300 to 350 iodine number, which consists essentially in polymerizing a methyl pentadiene feed consisting mainly of 2-methyl pentadiene-1,3 and substantially free from mono-olefins, at $-40°$ C. to $-164°$ C. in the presence of a Friedel-Crafts catalyst.

5. The process of making diolefin homopolymer synthetic rubber of high unsaturation having an iodine number of about 300 to 350, which consists essentially in polymerizing a methyl pentadiene feed consisting essentially of about 70 to 85% by weight of 2-methyl pentadiene-1,3, and about 30 to 15% by weight of 2-methyl pentadiene-2,4, at a temperature at least as low as $-78°$ C., in the presence of ½ to 10 volumes of inert diluent per volume of reactant and in the presence of a Friedel-Crafts catalyst.

6. A process according to claim 5 carried out in the presence of liquefied ethylene as refrigerant-diluent, at a temperature of about $-103°$ C., and using as catalyst a solution of aluminum chloride in methyl chloride.

7. A process according to claim 5 in which gaseous boron fluoride is used as catalyst.

8. Product of the process of claim 5.

9. A high unsaturation synthetic rubber, made by the process of claim 1.

10. A vulcanizable synthetic rubber having a Staudinger molecular weight of about 5,000 to 50,000, and having a high unsaturation as indicated by an iodine number of about 300 to 350, made by homopolymerization of 2-methyl pentadiene at a temperature at least as low as $-78°$ C. in the presence of a Friedel-Crafts catalyst.

WILLIAM J. SPARKS.
ROBERT M. THOMAS.
DONALD C. FIELD.

REFERENCES CITED

The following references are of record in the file of this patent:

UNITED STATES PATENTS

| Number | Name | Date |
|---|---|---|
| 2,142,980 | Huijser et al. | Jan. 3, 1939 |

OTHER REFERENCES

Bachman et al.: J. Am. Chem. Soc., vol. 64, April 1942, pp. 787–790.